Dec. 4, 1923.                  L. B. NEIGHBOUR                  1,476,634
                    SWIVEL CONNECTION FOR ELEVATOR CONVEYERS
                              Filed Aug. 22, 1921
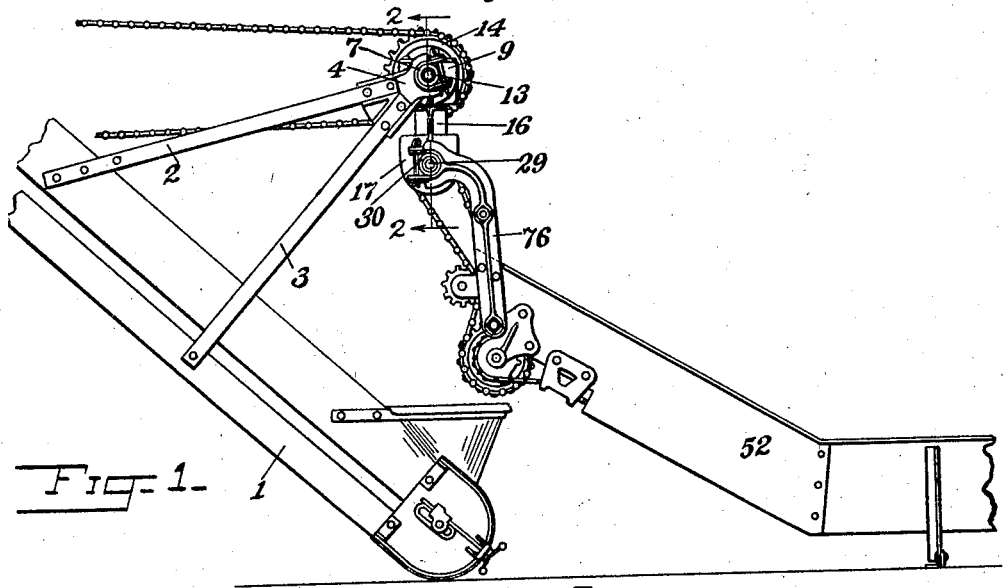
*Fig. 1.*
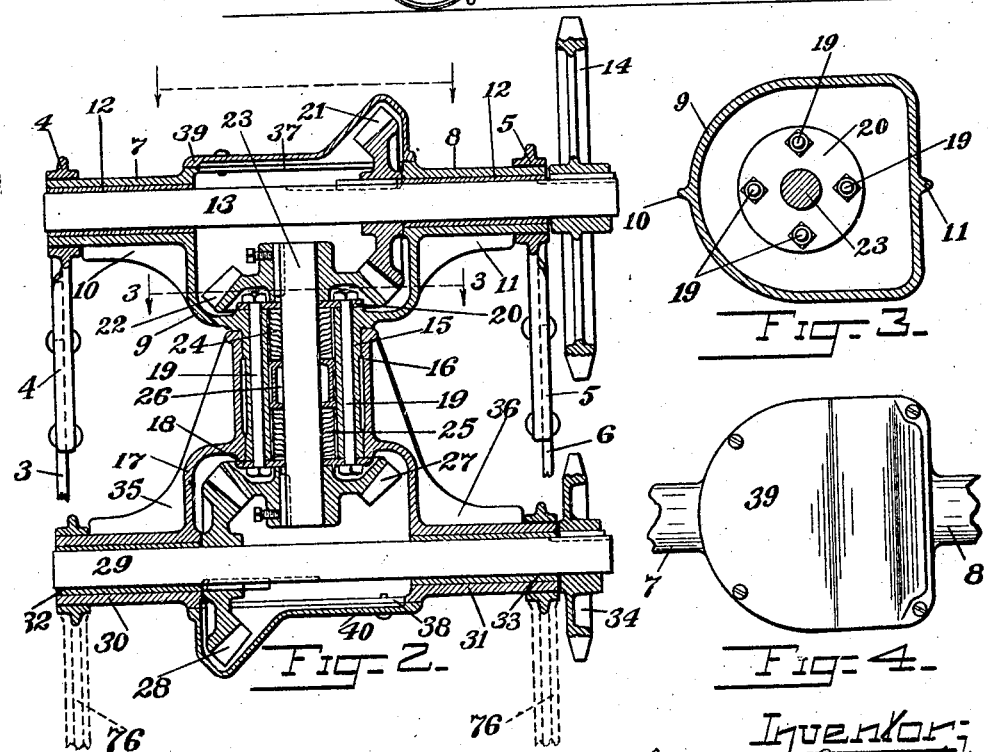
*Fig. 2.*   *Fig. 3.*   *Fig. 4.*
Witness:
E. Wilderson
Inventor:
Leonard B. Neighbour
by W. C. Johnston
Attorney Patented Dec. 4, 1923.

1,476,634

UNITED STATES PATENT OFFICE.

LEONARD B. NEIGHBOUR, OF EAST MOLINE, ILLINOIS, ASSIGNOR TO DEERE & COMPANY, OF MOLINE, ILLINOIS, A CORPORATION OF ILLINOIS.

SWIVEL CONNECTION FOR ELEVATOR CONVEYERS.

Application filed August 22, 1921. Serial No. 494,082.

*To all whom it may concern:*

Be it known that I, LEONARD B. NEIGHBOUR, a citizen of the United States, residing at East Moline, in the county of Rock Island and State of Illinois, have invented certain new and useful Improvements in Swivel Connections for Elevator Conveyers, of which the following is a specification, reference being had therein to the accompanying drawing.

My invention relates to conveying machinery of the class shown and described in Patent No. 1,353,841, issued to me under date of September 28, 1920, to which reference is made for a more extended description, the invention hereinafter described and claimed relating more particularly to the swivel connection of the conveyer hopper to the conveyer proper. The object of my invention is to improve the swivel connection for more effective operation, other objects being disclosed in the following specification.

Referring to the drawings in which similar numerals indicate identical parts—

Figure 1 illustrates the application of my invention to the rear of a conveyer and the forward end of a hopper. Figure 2 is an enlarged detail section on the line 2—2 of Figure 1. Figure 3 is a detail section on the line 3—3 of Figure 2, and Figure 4 is a plan view of the top of the upper section of the support.

To the lower part of an inclined conveyer 1 is secured a support comprising bars 2 and 3 converging upwardly and rearwardly to a casting 4. A similar structure is secured to the opposite side of the conveyer and is partly shown in dotted lines in Figure 2, in which 5 is a casting identical with the casting 4, and 6 is a supporting bar corresponding to the bar 3. The free ends of the castings 4 and 5 are bifurcated to receive bearings 7 and 8, preferably integral with the upper section 9 of a two part support, reinforced by webs 10 and 11 and lined with bushings 12. A shaft 13 is rotatably supported in the bearings 7 and 8 and has keyed on one end a sprocket 14.

Preferably integral with the section 9 is a downwardly extending cylindrical part 15 fitting within a similar cylindrical part 16 preferably integral with the lower section 17 of the housing. The section 17, is rotatably secured on the section 9 by a plate 18 on which the base of the cylindrical part 16 rests and which is rigidly secured to the cylindrical part 15, by bolts 19 which extend through suitable lengthwise borings in the wall of the cylindrical part 15 and through a plate 20 within the section 9.

Keyed on the shaft 13 within the section 9 is a bevel gear 21 which meshes with a bevel gear 22 rigidly mounted on the upper end of a vertical shaft 23. The shaft 23 is rotatably journaled in openings in the plates 18 and 20 and in upper and lower roller bearings 24 and 25 respectively within the cylindrical part 15, a collar 26 separates the two sets of bearings. On the lower end of the shaft 23 is rigidly secured a bevel gear 27 which meshes with a bevel gear 28 rigidly mounted on a horizontal shaft 29. The shaft 29 is journaled in bearings 30 and 31 lined with bushings 32 and 33 respectively, and preferably intergral with the section 17. The section 17 and the bearings 30 and 31 are reinforced by webs 35 and 36, and both the sections 9 and 17 are provided with openings 37 and 38 respectively, which are utilized in assembling my device and which are normally closed respectively by dust proof caps 39 and 40 secured in place by bolts or screws. A sprocket 34 is secured rigidly on the shaft 29.

As more clearly shown and described in the patent above referred to, the movable extended hopper 52 is connected to my device by the arms 76 mounted respectively on opposite sides of the hopper 52; the upper ends of said arms are bifurcated to receive the bearings 30 and 31. Power to operate a conveyer in the bottom of the hopper, is transmitted through the sprocket 14, actuating the train of gears within the sections 9 and 17, and operating the hopper conveyer through suitable gearing connected therewith and with the sprocket 34.

The conveying devices 1 and 52 can be swung laterally in either direction relatively to each other, as provided by the pivotal connection of the parts 9 and 17 of the support; they are also adjustable longitudinally independently of each other, the conveyer 1, through the supports 2 and 3, being movable about the shaft 13 to a greater or less degree of angularity than shown in the drawings, and it can also be moved longitudinally toward or from the conveyer 52, the parts 9 and 17 of the support being capable of a swinging movement on the shafts 13 and 29 respectively.

What I claim is—

1. In a conveyer mechanism, in which a conveying hopper is pivotally connected with the conveyer and operated by an interposed train of gearing, the combination therewith of a support for said gearing supported on the conveyer and conveying hopper, said support consisting of two parts, one part having a cylindrical portion rotatably supported on a cylindrical portion on the other part, and means to secure the two parts together.

2. In a conveyer mechanism, in which a conveying hopper is pivotally connected with the conveyer and operated by an interposed train of gearing, the combination therewith of a two part support for said gearing, one part supported on the conveyer and having a cylindrical portion, and the second part supported on the conveying hopper and having a cylindrical portion, the second part having a cylindrical portion rotatably connected with the cylindrical portion of the first part, and means to secure the two parts together.

3. In a conveyer mechanism, in which a conveying hopper is pivotally connected with the conveyer and operated by an interposed train of gearing, the combination therewith of a two part support for said gearing supported respectively on the conveyer and the conveying hopper, means connecting the two parts together and including a cylindrical portion on one part rotatably mounted on a cylindrical portion of the other part, and means to secure the two parts together.

4. In a conveyer mechanism, in which a conveying hopper is pivotally connected with the conveyer, the combination therewith of a two part support secured respectively on the conveyer and conveyer hopper, a shaft mounted in bearings on one part, a similar shaft mounted in bearings on the second part, each part having a cylindrical portion one within the other and rotatable relatively to each other, a shaft journaled in said cylindrical portions, intermeshing gears mounted on said shafts, and means to actuate said shafts from a source of power.

5. In a conveyer mechanism, in which a conveying hopper is pivotally connected to the conveyer by a supporting element composed of two parts secured respectively to the conveyer and conveyer hopper, each part having a cylindrical portion secured one within the other and rotatable relative to each other, a horizontally disposed shaft journaled in bearings on one of said parts, a similar shaft journaled in bearings on the other part, gears on said shafts, a shaft journaled in bearings in said cylindrical portions, gears on said shaft in mesh with the gears on the other shafts, and means to actuate said shafts from a source of power.

6. In a conveyer mechanism, in which a conveying hopper is pivotally connected to a conveyer by a supporting element composed of two parts secured respectively to the conveyer and conveyer hopper, each part having a cylindrical portion secured one within the other and rotatable relative to each other, a horizontally disposed shaft journaled in bearings on one of said parts, a similar shaft journaled in bearings on the other part in a plane parallel to the plane of the first mentioned shaft, a vertical shaft journaled in bearings in the cylindrical parts, intermeshing gears mounted on said shafts, and means to actuate said shafts from a source of power.

7. In a conveyer mechanism in which a conveying hopper is pivotally connected with the conveyer and operated by an interposed train of gearing, the combination therewith of a support composed of two parts rotatably connected and supported respectively on the conveyer and conveying hopper, a shaft journaled in bearings in one part of said support, a shaft journaled in bearings in the second part of said support, gears on said shafts, a vertical shaft supported in a bearing in the first part of said support and gears thereon in mesh with the gears on the other shafts.

LEONARD B. NEIGHBOUR.